US006828012B2

(12) United States Patent
Groft et al.

(10) Patent No.: US 6,828,012 B2
(45) Date of Patent: Dec. 7, 2004

(54) SLAB SHIELD INSULATION

(76) Inventors: Cory L. Groft, 301 St. Johns Rd., Littlestown, PA (US) 17340; Thomas W. Dauber, R.D. 2, P.O. Box 2387, Spring Grove, PA (US) 17362

( * ) Notice: Subject to any disclaimer, the term of this patent is extended or adjusted under 35 U.S.C. 154(b) by 81 days.

(21) Appl. No.: 10/115,932

(22) Filed: Apr. 5, 2002

(65) Prior Publication Data

US 2002/0146553 A1 Oct. 10, 2002

Related U.S. Application Data

(60) Provisional application No. 60/282,473, filed on Apr. 10, 2001.

(51) Int. Cl.[7] ..................... B32B 3/26; B32B 3/00; B32B 9/00

(52) U.S. Cl. ..................... 428/304.4; 428/316.6; 428/318.4; 428/319.9

(58) Field of Search ..................... 428/304.4, 316.6, 428/318.4, 319.9

(56) References Cited

U.S. PATENT DOCUMENTS 3,111,787 A 11/1963 Chamberlain
3,468,086 A 9/1969 Warner
3,499,819 A 3/1970 Lewis
3,637,458 A * 1/1972 Parrish ..................... 428/314.2
4,073,998 A 2/1978 O'Connor
4,121,958 A 10/1978 Koonts
4,271,218 A 6/1981 Heckel et al.
4,726,985 A 2/1988 Fay et al.
4,887,368 A * 12/1989 Latzke ..................... 607/111
4,936,070 A 6/1990 Michaud
5,100,725 A 3/1992 Pearson
5,316,835 A 5/1994 Groft et al.
5,393,598 A * 2/1995 Schlecker ..................... 442/186
5,421,133 A 6/1995 Berdan, II et al.
5,475,306 A 12/1995 Lüdeke et al.
5,597,979 A 1/1997 Courtney et al.
5,766,721 A 6/1998 Bussey, Jr. et al.
6,018,918 A 2/2000 Long, Sr.
6,067,765 A 5/2000 Jones
6,110,563 A 8/2000 Pienimaa et al.
6,125,597 A 10/2000 Hoffman et al.
6,128,879 A 10/2000 Bussey, Jr. et al.

* cited by examiner

*Primary Examiner*—Terrel Morris
*Assistant Examiner*—Victor S Chang
(74) *Attorney, Agent, or Firm*—Nixon Peabody LLP; Daniel S. Song

(57) ABSTRACT

A multi-layer slab insulation having an aluminum layer, a first foam layer positioned on one side of the aluminum layer, and a second foam layer positioned on another side of the aluminum layer. In one embodiment, the first and second foam layers are polyolefin foam layers such as polyethylene foam and polypropylene foam. The aluminum layer is an aluminum foil and may be provided with strengthening layers. Alternatively, the aluminum layer is a metallized film. Preferably, the various layers are laminated together. In another embodiment, a multi-layer slab insulation includes a first foam layer, and a second foam layer laminated to the first foam layer, at least one of the foam layers being provided with at least one extending lip sized to allow interlocking of the multi-layer slab insulation with an adjacent multi-layer slab insulation.

25 Claims, 2 Drawing Sheets

SLAB SHIELD INSULATION

The present application is based upon provisional application Ser. No. 60/282,473 filed Apr. 10, 2001.

BACKGROUND OF THE INVENTION

1. Field of the Invention

The present invention is directed to insulation and insulation arts. In particular, this invention is directed to insulation which is adapted for use underneath slabs of construction material such as concrete.

2. Description of Related Art

In the construction and building industries, various types of insulation have been used to minimize heat transfer. For instance, it has been known to insulate concrete driveways, walkways, and foundations by placing a sheet of insulating material between the ground and slab of concrete. In addition, it has also been known to utilize insulating material in the construction of building freezers, coolers, and food processing facilities where the temperature control is significant. In such applications, insulating materials are provided within the walls of the facility to again, minimize heat transfer.

Various multi-layered insulating materials are known in the art. For example, U.S. Pat. No. 5,100,725 to Pearson discloses an insulation and heat reflective barrier that includes a plurality of radiant heat barrier layers at the core, and a pair of foam insulating material which is adhered to the radiant heat barrier layers via an adhesive. In addition, U.S. Pat. No. 5,316,835 to Groft et al. similarly discloses a low emissivity insulation wherein a polyethylene foam core is provided with an aluminum layer on each side.

Despite the known art, an effective insulation product which can economically be used to insulate slabs is not known in the art. In particular, an economical insulation which provides adequate resistance against conductive heat transfer to/from construction slabs is not readily available in the marketplace. The available insulation for slabs using construction also do not provide resistance to radiative heat transfer and may also allow moisture and caustic materials from the slab to seep through the insulation.

In view of the above, there exists an unfulfilled need for an insulation which can effectively be used to insulate slabs used in construction such as slabs of concrete, as economical, and avoids the limitations of the presently available insulation products.

SUMMARY OF THE INVENTION

In view of the foregoing, one advantage of the present invention is that it provides multi-layer slab insulation that may be used to insulating slabs used in construction.

Another advantage of the present invention is that it provides a multi-layer slab insulation that minimizes radiative heat transfer through the slabs.

Still another advantage of the present invention is that it provides a multi-layer slab insulation having extending lips that facilitate installation and increases effectiveness of the insulation.

These and other advantages are attained by a multi-layer slab insulation in accordance with one embodiment of the present invention having an aluminum layer, a first foam layer positioned on one side of the aluminum layer, and a second foam layer positioned on another side of the aluminum layer. In one embodiment, the first and second foam layers are polyolefin foam layers such as polyethylene foam and polypropylene foam having a thickness of 0.25 to 0.5 inch.

In accordance with one embodiment, the aluminum layer of the multi-layer slab insulation includes an aluminum foil having a thickness of 0.00025 to 0.0005 inch. In this regard, the aluminum layer may be made of 1100–1145 wettable aluminum. In addition, a first strengthening layer may be positioned between the aluminum foil and the first foam layer, and a second strengthening layer may be positioned between the aluminum foil and the second foam layer. The strengthening layers may be extruded lineal low density polyethylene films having a thickness of approximately 0.001 inch. Preferably, the first and second foam layers, first and second strengthening layers, and the aluminum layer are laminated together by applying heat or by applying an adhesive.

In accordance with another embodiment, the aluminum layer of the multi-layer slab insulation includes a metallized film. In another embodiment, the metallized film is a polyolefin film or a polyester film with aluminum coating thereon. Preferably, the first and second foam layers, and the metallized film are laminated together.

In accordance with another aspect of the present invention, a multi-layer slab insulation is provided with a first polyolefin foam layer that is offset relative to the second polyolefin foam layer to provide a first extending lip on the first polyolefin foam layer and a second extending lip on the second polyolefin foam layer. In another embodiment, the second polyolefin foam layer is larger in width than the first polyolefin foam layer to provide two extending lips on the second foam layer. Moreover, at least one extending lip may be provided with an adhesive to adhere to an extending lip of an adjacent multi-layer slab insulation.

These and other objects, features and advantages of the present invention will become more apparent from the following detailed description of the preferred embodiments of the present invention when viewed in conjunction with the accompanying drawings.

DETAILED DESCRIPTION OF THE PREFERRED EMBODIMENT

As will be appreciated by one of ordinary skill in the art, the multi-layered insulation in accordance with the present invention may be used to effectively insulate slabs used in construction thereby fulfilling an unfulfilled need in the construction industry. In various embodiments of the present invention discussed below, provisions are made to minimize radiative heat transfer through the slabs. It will also be evident that in other embodiments of the present invention, provisions are made to facilitate installation of the insulation and to increase its effectiveness.

Figure 1:
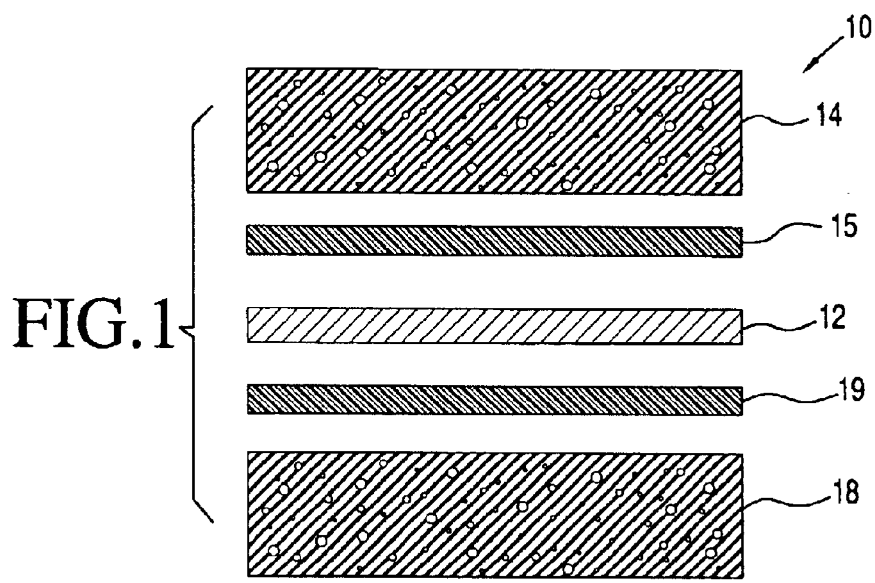
FIG. 1 is a separated view of a multi-layered insulation in accordance with one embodiment of the present invention.

FIG. 1 shows a separated view of a multi-layered insulation 10 in accordance with one embodiment of the present invention which may be effectively used to insulate construction slabs such as slabs of concrete or other construction materials. The multi-layer slab insulation 10 in the illustrated embodiment includes an aluminum layer 12, a first foam layer 14 positioned on one side of the aluminum layer 12, and a first strengthening layer 15 positioned between the aluminum layer 12 and the first foam layer 14. In addition, as can be seen the multi-layered insulation 10 also includes a second foam layer 18 that is positioned on the other side of the aluminum layer 12, and a second strengthening layer 19 positioned between the aluminum layer 12 and the second foam layer 18. It should be noted that FIG. 1 as well as the other figures showing various embodiments of the present invention are not to scale and the thicknesses of the aluminum layer 12 and the strengthening layers 15 and 19 have been greatly enlarged relative to the first and second foam layers 14 and 18 for clarity purposes. Moreover, as further explained in detail above, these various layers are laminated together to provide a multi-layer slab insulation 10.

It should also be noted that the term "foam layer" as used herein should be understood broadly to mean any insulating layer with pockets of air or gas that insulates against conductive heat transfer between the construction slab and any adjoining surface such as the ground surface, another slab, or other surfaces. Such foam layers also provides a degree of compressibility to allow the multi-layer insulation to be flexible so that it resists damage which otherwise may be caused by surface inconsistencies of the ground and/or the slab. In this regard, one or both of the foam layers may be polyolefin foam layers such as polypropylene foam. For instance, one or more of the foam layers may be made of a low density microcell foam, be made of "bubble wrap" such as that used in the packaging and shipping industry, or any appropriate layer having pockets of air or gas.

In the illustrated embodiment of FIG. 1, the first foam layer 14, and the second foam layer 18 are polyolefin foam layers such as polypropylene foam having a thickness of 0.25 to 0.5 inch. In this regard, the polypropylene foam may be a low density microcell foam. The first and second foam layers 14 and 18 reduce conductive heat transfer and because of the compressibility of the foam layers, the multi-layer slab insulation 10 is flexible. Of course, in other embodiments, polyethylene foam may be used instead. However, such foam layers made of low density microcell foam has been found to be very effective in insulating slabs.

In addition, the aluminum layer 12 in the illustrated embodiment may be made of 1100–1145 wettable aluminum foil having a thickness of 0.00025 to 0.0005 inch. Because of the propensity for the aluminum foil used for the aluminum layer 12 to tear under any type of stress, first and second strengthening layers 15 and 19 are provided on the sides of the aluminum layer 12. These strengthening layers 15 and 19 provide tear resistance to the aluminum layer 12. In this regard, in the illustrated embodiment, the first and second strengthening layers 15 and 19 respectively, are extruded lineal low density polyethylene films having a thickness of approximately 0.001 inch, although other thicknesses may also be used.

The embodiment where the first and second strengthening layers 15 and 19, respectively, are made of polyethylene is especially advantageous in that they resist moisture and/or caustic liquids from penetrating through the multi-layer slab insulation 10. Thus, for example, the multi-layer slab insulation 10 resists moisture from the ground from seeping into the slabs which may be made of concrete and further resists caustic liquids penetrating through or from the slab from seeping into the ground. Of course, it should be also noted that this is only one significant advantage and application of the multi-layer slab insulation 10 in accordance with the present invention and other advantages may be realized in applying the present invention to other applications.

As previously noted, in accordance with the preferred embodiment of the present invention, the first and second foam layers 14 and 18, first and second strengthening layers 15 and 19, and the aluminum layer 12 are all laminated together. In this regard, lamination of the layers may be attained in any appropriate manner. For instance, lamination of the layers may be attained by applying heat such as by flame or hot rollers, etc. Alternatively, the various layers may be laminated together by applying an adhesive between the layers. Of course, combination of various methods may also be used as well.

Figure 2:
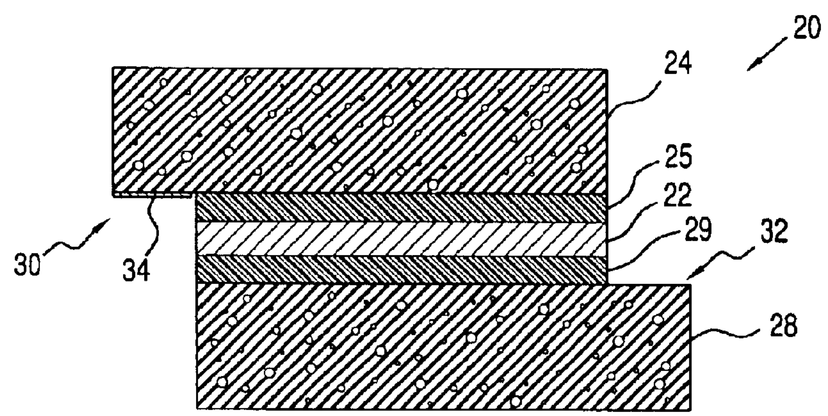
FIG. 2 is a profile view of a multi-layered insulation in accordance with another embodiment of the present invention having an extending lip and with the aluminum layer and the strengthening layers being shown with exaggerated thickness.

FIG. 2 is a profile view of a multi-layered insulation 20 in accordance with another embodiment of the present invention having the same layers as the multi-layered insulation 10 described above relative to FIG. 1. As can be seen, the multi-layer slab insulation 20 also includes an aluminum layer 22, a first foam layer 24 positioned on one side of the aluminum layer 22, and a first strengthening layer 25 positioned between the aluminum layer 22 and the first foam layer 24. In addition, the multi-layered insulation 20 further includes a second foam layer 28 that is positioned on the other side of the aluminum layer 22, and a second strengthening layer 29 positioned between the aluminum layer 22 and the second foam layer 28. Again, the aluminum layer 22 and the first and second strengthening layers 25 and 29 are shown with exaggerated thickness for clarity.

As can also be seen, the first foam layer 24 of the multi-layer slab insulation 20 of FIG. 2 is offset relative to the second foam layer 28. This provides a first extending lip 30 on the first foam layer 24 and a second extending lip 32 on the second foam layer 32. As will be explained in further detail below, the first and second extending lips 30 and 32 are sized to allow interlocking of the multi-layer slab insulation 20 with an adjacent multi-layer slab insulation (not shown). In addition, although not required, an adhesive 34 may be provided on the first extending lip 30 and/or the second extending lip 32 to allow securing of the interlocked extending lips of adjacent multi-layer slab insulation. The adhesive 34 may be covered with a removable covering (not shown) which is removed prior to installation of the multi-layer slab insulation 20 so that the first extending lip 30 may be adhered to a second extending lip of an adjacent multi-layer slab insulation (not shown).

Figure 3:
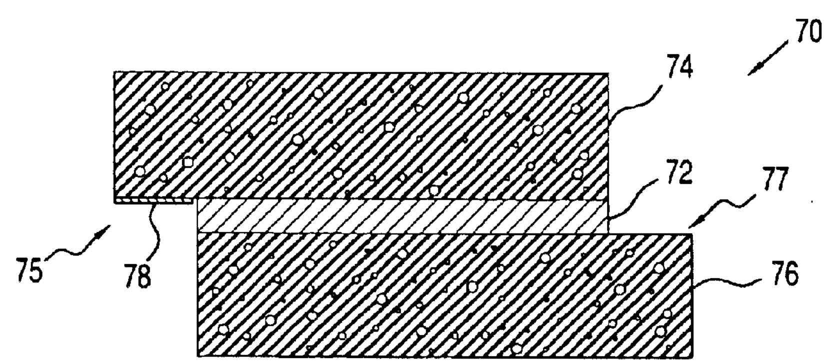
FIG. 3 is a profile view of a multi-layered insulation in accordance with another embodiment of the present invention having an extending lip where a metallized film is used.

In addition, whereas the embodiments shown in FIGS. 1 and 2 discussed above utilized an aluminum foil for the aluminum layer, other types of aluminum layers may be used in other embodiments as well. In this regard, FIG. 3 illustrates a multi-layered insulation 70 in accordance with still another embodiment of the present invention. The multi-layered insulation 70 utilizes a metallized film 72 having an aluminum coating. In particular, the metallized film 72 may be made of a polyolefin film with aluminum coating thereon, for instance, polyethylene film. Of course, in other embodiments, different polyolefin film may be used such as polypropylene film. Furthermore, in still other embodiments, polyester film such as Mylar® may be used as the aluminum layer instead of the aluminum foil. The metallized film 72 is preferably laminated between the first foam layer 74 and the second foam layer 76 in any appropriate manner such as adhesive lamination or by heat lamination. Of course, in the embodiment of FIG. 3, first and second strengthening layers discussed previously with respect to FIGS. 1 and 2 are not required since the aluminum layer is provided directly on the surface of the film which is resistant to tearing.

As also shown, the first foam layer 74 of the multi-layer slab insulation 70 of FIG. 3 is offset relative to the second foam layer 76. This provides a first extending lip 75 on the first foam layer 74 and a second extending lip 77 on the second foam layer 76 to allow interlocking of the multi-layer slab insulation 70 with an adjacent multi-layer slab insulation (not shown). In addition, the illustrated embodiment is also provided with an optional adhesive 78, for instance, on the first extending lip 75 to allow securing of the of the interlocked extending lip of adjacent multi-layer slab insulation.

Figure 4:
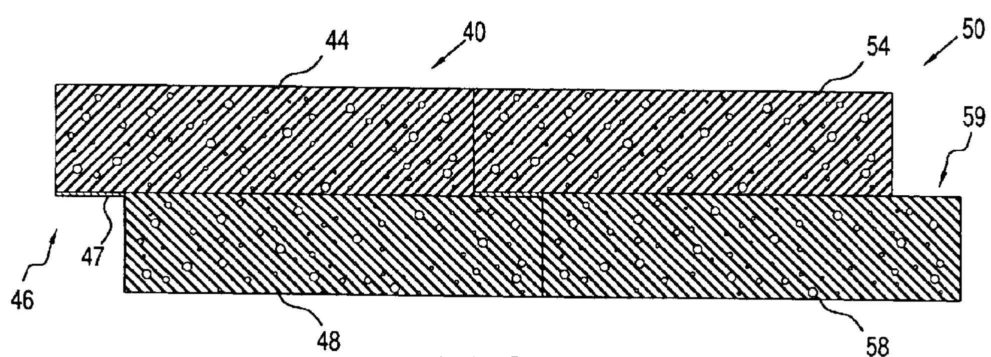
FIG. 4 is a profile view of two multi-layered insulation in accordance with yet another embodiment of the present invention having an extending lip that are interlocked with one another.

FIG. 4 is a profile view of two multi-layered insulation 40 and 50 in accordance with yet another embodiment of the present invention which are interlocked with one another. In particular, multi-layered insulation 40 and 50 shown are different from the embodiments discussed relative to FIGS. 1 and 2 in that the first foam layer and the second foam layer are directly laminated together, without an aluminum layer. Of course, in other embodiments, the aluminum foil and the strengthening layers, or the metallized film may be provided as described relative to FIGS. 1 to 3 so that enhanced resistance to radiative heat transfer may be attained, and to prevent moisture and/or caustic elements from seeping through the insulation.

The multi-layered insulation 40 includes a first foam layer 44 which is offset from the second foam layer 48 to provide first extending lip 46 and the second extending lip (not enumerated), the first extending lip 46 including an adhesive 47. Likewise, the multi-layered insulation 50 includes a first foam layer 54 which is offset from the second foam layer 58 to provide first extending lip (not enumerated) and the second extending lip 59. The first and second foam layers of the multi-layered insulation 40 and 50 are laminated together in any appropriate manner such as by applying heat or an adhesive.

As can be seen, the first extending lip of the multi-layered insulation 50 is provided with an adhesive and is interlocked and adhered to the second extending lip of the multi-layered insulation 40. In the illustrated manner, the installation of multi-layered insulation can be readily facilitated. Moreover, because of the interlocking extending lips, gaps which would otherwise exist between two adjacent multi-layered insulation can be substantially eliminated thereby providing a continuously insulated surface so that penetration of moisture and/or caustic materials to/from the slab that otherwise would occur can be minimized.

Figure 5:
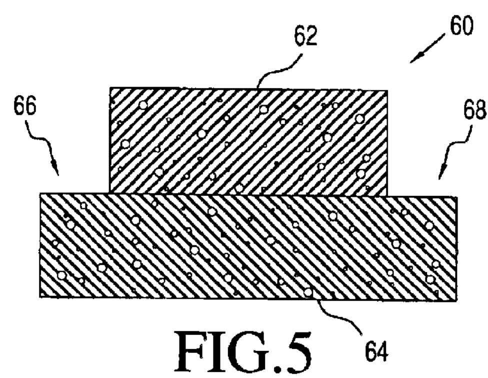
FIG. 5 is a profile view of a multi-layered insulation in accordance with still another embodiment of the present invention having an extending lip.

FIG. 5 is a profile view of a multi-layered insulation 60 in accordance with still another embodiment of the present invention. As can be seen, in this embodiment, the second polyolefin foam layer 64 is larger in width than the first polyolefin foam layer 62 so that two extending lips 66 and 68 are provided on the second foam layer 64.

By providing such a geometry, an adjacent multi-layer slab insulation (not shown) can be oriented in a complementary manner where it is rotated 180 degrees compared to the multi-layered insulation 60 shown so that the extending lips can interlock together. In addition, as previously noted, one or both of the extending lips may be provided with an adhesive to adhere to an extending lip of an adjacent multi-layer slab insulation (not shown). Moreover, in yet other embodiments, aluminum layer and/or strengthening layers may be provided as described relative to FIGS. 1 and 3.

In the above disclosed embodiments of FIGS. 1 to 5, it has been found that foam layers made of polyolefin such as polypropylene or polyethylene provide a good balance between insulating properties and cost. In addition, by utilizing these materials, the multi-layer slab insulation may be provided as boards or in rolls which are cut to size by the user. Furthermore, due to the flexibility of polyolefin foam, the multi-layer slab insulation in accordance with the present invention does not break when heavy objects such as concrete slabs are placed thereon. In applications where the surface has curvatures, the flexibility of the multi-layer slab insulation allows it to conform to such curvatures.

Polyolefin foam having a thickness of 0.25 to 0.5 inch have been found to be very effective. In addition, with respect to the embodiment where the aluminum layer is made of an aluminum foil, 1100–1145 wettable aluminum having a thickness of 0.00025 to 0.0005 inch has been found to be very effective in minimizing radiative heat transfer. Moreover, in this regard, strengthening layers made of extruded lineal low density polyethylene films having a thickness of approximately 0.001 inch have been found to be very effective in providing tear resistance to the aluminum foil. Lastly, a metallized film such as a polyolefin film or polyester film with aluminum coating thereon, for example, may be alternatively used as discussed above.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A flexible multi-layer slab insulation comprising:

an aluminum layer;

a first foam layer positioned on one side of said aluminum layer;

a second foam layer positioned on another side of said aluminum layer; and at least one strengthening layer positioned between said aluminum layer and at least one of said first foam layer and said second foam layer;

wherein said first foam layer is provided with a first extending lip extending beyond said second foam layer, said first extending lip being a continuous integral extension of said first foam layer having substantially the same thickness as said first foam layer, and being sized to allow interlocking of said multi-layer slab insulation with an adjacent multi-layer slab insulation.

2. The multi-layer slab insulation of claim 1, wherein said first and second foam layers are polyolefin foam layers.

3. The multi-layer slab insulation of claim 2, wherein said polyolefin foam layers have a thickness of 0.25 to 0.5 inch.

4. The multi-layer slab insulation of claim 2, wherein said polyolefin foam layers are made of at least one of polyethylene foam and polypropylene foam.

5. The multi-layer slab insulation of claim 4, wherein said polyolefin foam layers are made of polypropylene low density microcell foam.

6. The multi-layer slab insulation of claim 1, wherein said aluminum layer includes an aluminum foil having a thickness of 0.00025 to 0.0005 inch.

7. The multi-layer slab insulation of claim 6, wherein said aluminum layer is made of at least one of 1100 wettable aluminum and 1145 wettable aluminum.

8. The multi-layer slab insulation of claim 6, wherein said at least one strengthening layer includes a first strengthening layer positioned between said aluminum foil and said first foam layer, and a second strengthening layer positioned between said aluminum foil and said second foam layer.

9. The multi-layer slab insulation of claim 8, wherein said strengthening layers have a thickness of approximately 0.001 inch.

10. The multi-layer slab insulation of claim 8, wherein said strengthening layers are extruded low density polyethylene films.

11. The multi-layer slab insulation of claim 8, wherein said first and second foam layers, first and second strengthening layers, and said aluminum layer are laminated together.

12. The multi-layer slab insulation of claim 11, wherein said first and second foam layers, first and second strengthening layers, and said aluminum layer are laminated together by applying heat to bond said layers together.

13. The multi-layer slab insulation of claim 11, wherein said first and second foam layers, first and second strengthening layers, and said aluminum layer are laminated together by applying an adhesive to bond said layers together.

14. The multi-layer slab insulation of claim 1, wherein said aluminum layer includes a metallized film.

15. The multi-layer slab insulation of claim 14, wherein said metallized film is at least one of a polyolefin film with aluminum coating thereon and a polyester film with aluminum coating thereon.

16. The multi-layer slab insulation of claim 14, wherein said first and second foam layers, and said metallized film are laminated together.

17. The multi-layer slab insulation of claim 1, wherein said second foam layer is provided with a second extending lip that extends beyond said first foam layer, said second extending lip being an integral extension of said second foam layer and being sized to allow interlocking of said multi-layer slab insulation with adjacent multi-layer slab insulation.

18. The multi-layer slab insulation of claim 17, wherein said first foam layer and said second foam layer have substantially the same width, said first foam layer being offset relative to said second foam layer to provide said first extending lip on said first foam layer and said second extending lip on said second foam layer.

19. The multi-layer slab insulation of claim 17, wherein said first extending lip is provided with an adhesive to adhere to an extending lip of an adjacent multi-layer slab insulation.

20. A flexible multi-layer slab insulation comprising:

an aluminum layer made of at least one of 1100 wettable aluminum foil and 1145 wettable aluminum foil having a thickness of 0.00025 to 0.0005 inch;

a first polyolefin foam layer having a thickness of 0.25 to 0.5 inch positioned on one side of said aluminum layer;

a first strengthening layer positioned between said aluminum layer and said first foam layer;

a second polyolefin foam layer having a thickness of 0.25 to 0.5 inch positioned on another side of said aluminum layer; and a second strengthening layer positioned between said aluminum layer and said second foam layer;

wherein said layers are laminated together, and at least one of said first polyolefin foam layer and second polyolefin foam layer is provided with at least one extending lip sized to allow interlocking of said multi-layer slab insulation with an adjacent multi-layer slab insulation, said at least one extending lip being formed as an integral extension of one of said first polyolefin foam layer and second polyolefin foam layer beyond the other of said polyolefin foam layer, said at least one extending lip having substantially the same thickness as said polyolefin foam layer from which said at least one extending lip extends.

21. The multi-layer slab insulation of claim 20, wherein said first foam layer is offset relative to said second foam layer to provide a first extending lip on said first foam layer and a second extending lip on said second foam layer.

22. The multi-layer slab insulation of claim 20, wherein said second foam layer is larger in width than said first extending lip to provide two extending lips on said second foam layer.

23. The multi-layer slab insulation of claim 20, wherein said at least one extending lip is provided with an adhesive to adhere to an extending lip of an adjacent multi-layer slab insulation.

24. A flexible multi-layer insulation comprising:

an aluminum layer;

a first foam layer of polyolefin foam positioned on one side of said aluminum layer, said first foam layer having a thickness dimension and a width dimension;

a first strengthening layer positioned between said aluminum layer and said first foam layer;

a second foam layer positioned on another side of said aluminum layer, said second foam layer having substantially same thickness dimension as said first foam layer and a width dimension; and a second strengthening layer positioned between said aluminum layer and said second foam layer;

wherein said second foam layer is larger in width than said first foam layer so that said second foam layer extends beyond said first foam layer to provide two extending lips on said second foam layer to allow interlocking of said multi-layer insulation with an adjacent multi-layer insulation, said extending lips being partially defined by edges of said first foam layer, and being continuous extensions of said second foam layer thereby having substantially the same thickness as said second foam layer.

25. A multi-layer insulation consisting of:

an aluminum layer made of at least one of 1100 wettable aluminum foil and 1145 wettable aluminum foil having a thickness of 0.00025 to 0.0005 inch;

a first polyolefin foam layer having a thickness of 0.25 to 0.5 inch positioned on one side of said aluminum layer;

a first strengthening layer positioned between said aluminum layer and said first foam layer;

a second polyolefin foam layer having a thickness of 0.25 to 0.5 inch positioned on another side of said aluminum layer; and a second strengthening layer positioned between said aluminum layer and said second foam layer.

* * * * *